UNITED STATES PATENT OFFICE.

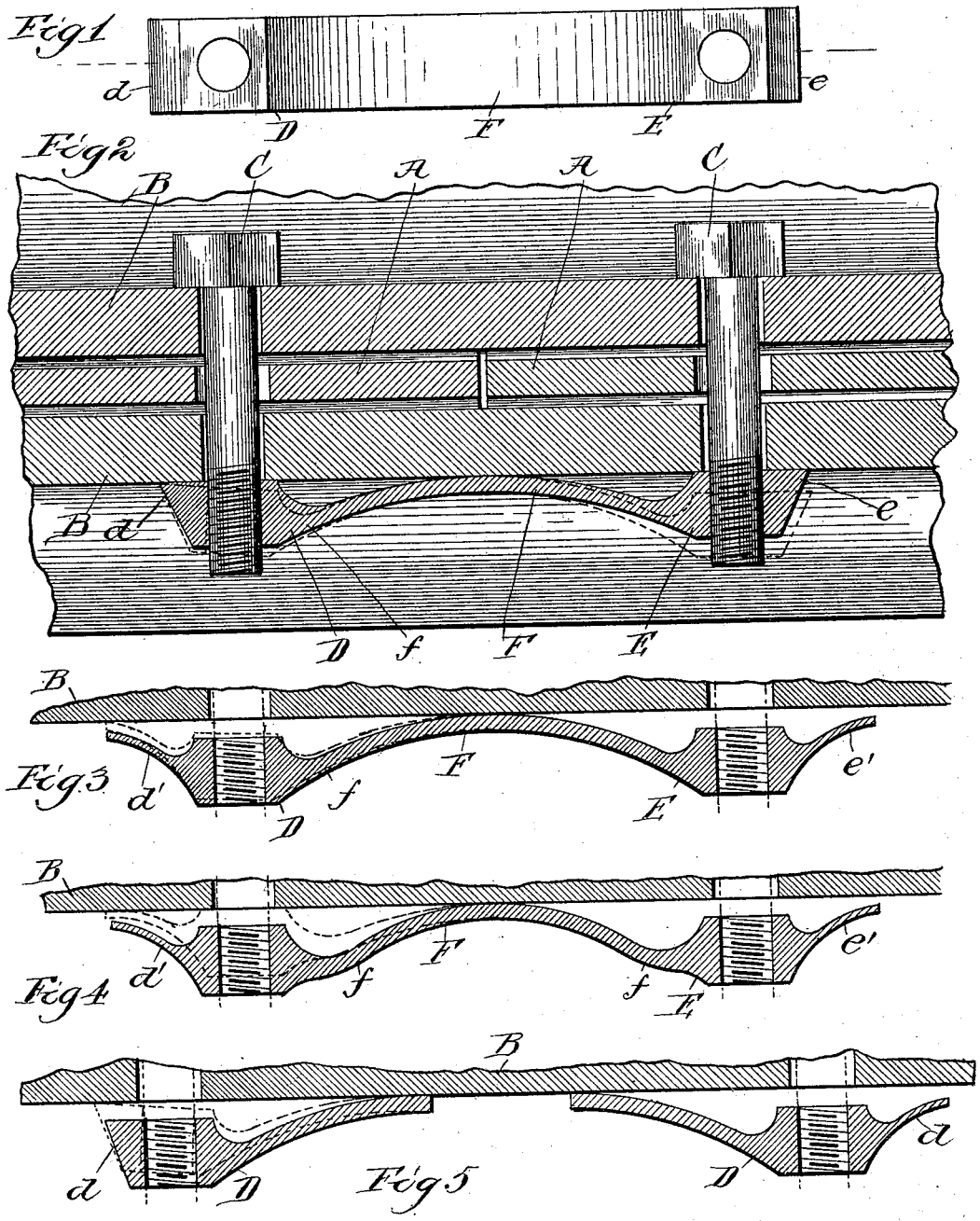

JOSEPH J. HARRELL, OF CHICAGO, ILLINOIS.

NUT-LOCK.

SPECIFICATION forming part of Letters Patent No. 625,501, dated May 23, 1899.

Application filed August 1, 1898. Renewed April 21, 1899. Serial No. 713,962. (No model.)

*To all whom it may concern:*

Be it known that I, JOSEPH J. HARRELL, a citizen of the United States of America, and a resident of Chicago, county of Cook, and State of Illinois, have invented certain new and useful Improvements in Threaded Nuts, of which the following is a full, clear, and exact description, and which are illustrated in the accompanying drawings, forming a part thereof.

The present invention is an improvement upon the device shown in my application for Letters Patent filed March 12, 1898, Serial No. 673,588. In the construction shown in that application a pair of nuts were united by a bow-spring, and as the bolts were turned up and the spring thereby straightened the axes of the two nut-apertures were thrown out of alinement with the bolts, their inner ends converging. A bite was thus secured which prevented the bolts from working loose; but as this deflection of the nut-aperture resulted from a comparatively slight movement of the nut it was necessary to use bolts of such length that they required to be turned but little in order to screw them up tight.

The present invention provides means for holding nuts of the same type so nearly in alinement with the bolts that undue lateral strain upon the latter and a destructive bite upon the threads are avoided, though the relative movement of the nut and bolt may be considerable, and this is accomplished without losing the advantage of the bite of the nut upon the bolt, which prevents the accidental unscrewing of the bolt.

The object of the invention is attained by providing each nut with a toe-piece projecting oppositely from the spring and being either rigid or elastic, this toe-piece being adapted to come into contact with the plate against which the nut is to bear and prevent the tilting of the latter by reason of the straightening of the bow-spring, the spring being flexed in a reverse direction near its ends. The lateral strain upon the bolt is due to the effort of the ends of the spring to resume their normal form and is in the reverse direction from that due to the stress of its bow. This strain tends to tilt the nut by raising its heel portion or inner side, or, in other words, the nut becomes a lever of the second class, the fulcrum being at its toe, the bolt being the load, and the tension of the spring end being the power. This lateral strain upon the bolt is constant and is of course greatest when the nut is drawn down firmly against the bearing-plate, thereby insuring the secure holding of the nut against rotation. The slightest easing of the pressure of the heel or inner side of the nut upon the bearing-plate, due to wear from chafing or to the elongation of the bolt by expansion, increases the bite of the nut upon the bolt by allowing a corresponding tilting of the former upon its toe, thereby locking the parts together still more securely.

The invention is adapted as well to single as to twin nuts.

In the accompanying drawings, Figure 1 is a face view of a pair of nuts united by a bow-spring. Fig. 2 is a detail plan section of the ends of a pair of railroad-rails, taken through the web of the rails and showing the fish-plates as being attached by a pair of bolts secured by my improved form of nut. Fig. 3 is a similar plan section showing, however, only the threaded ends of the bolts, a modified form of the nut being shown. Fig. 4 is a similar view of Fig. 3, but with the spring uniting the nuts shown with exaggerated curves in order to more clearly illustrate its action; and Fig. 5 shows a pair of the nuts as applied to bolt ends, but being separated each from the other, each nut being provided with its own spring-stem.

At A A, I show the web portion of a pair of abutting railroad-rails and at B B a pair of fish-plates attached thereto, the bolts for securing the fish-plates being shown at C C and being secured by means of the nuts D E. These nuts are shown in Figs. 1, 2, 3, and 4 as being united by a bow-spring F, the middle portion of which normally extends beyond the plane of the inner faces of the nuts.

In the form of construction shown in Fig. 2 each nut is provided with a toe-piece d e, projecting in the opposite direction from the spring F and being formed as a rigid part of the body of the nut. It will be seen that in turning up the bolt the spring F will be straightened, and as the nut is drawn down toward the fish-plate its inner face will become inclined with reference thereto and the axis of the nut-aperture thrown out of alinement with the axis of the bolt. The bite of the nut upon the bolt occasioned by this change of their relation renders it more difficult to turn up the bolt and causes some danger of rupturing the thread. To overcome this difficulty, the toe $d\ e$ is provided, which, coming in contact with the fish-plate, straightens up the nut, bringing the axis of its aperture again into line with the axis of the bolt. This second change of position of the nut involves a straightening of the spring F near its end at the point marked $f$, the spring being bent at this point in the opposite direction from the flexure at its middle portion. The effort of the spring end to assume its normal form tends to tilt the nut on its toe, and consequently to throw its aperture out of alinement with the bolt, causing a sharp bite at the inner side of the outer end and at the outer side of the inner end of the aperture sufficient to prevent the turning of the bolt except by the application of very considerable torsional strain. Should the parts become loosened by the chafing of the fish-plate or the head of the bolt or by the lengthening of the bolt due to expansion, the tendency of the spring to assume its original curved form at $f$ will correspondingly tilt the nut by raising its inner side or heel, thus throwing the axis of the nut-aperture out of line with the axis of the bolt and increasing the bite of the one part upon the other. This reverse curvature and flexure of the spring F will be better understood by reference to Fig. 4, where the form of the spring at the points $ff$ is distorted for the purpose of clearness of illustration.

For the rigid toe $d\ e$ there may be substituted a spring-toe $d'\ e'$, as shown in Fig. 3, the toe-piece extending from the body of the nut and being inclined toward and extending beyond the plane of its inner face. This spring-toe piece is of less tension than the spring F, and while serving the same purpose as the rigid toe $d\ e$ it provides for a greater range of movement of the nut upon the bolt and still keeps these two parts in proper relation or so nearly in alinement that there is no danger of the rupturing of the threads by reason of the bite of one part upon the other. The spring F being, however, of the greater tension, the action of the nut is the same as when the rigid toe is used.

As in some situations the uniform spacing of the bolt-holes in the rails and fish-plates is departed from, I provide for the application of my improved bolt and nut to these odd situations by separating some of the pairs of nuts, as shown in Fig. 5. The action of the individual nut is the same whether separated from or joined to its companion. I show also in Fig. 5 both sets of toe-pieces, as either is serviceable in connection with the divided nuts.

I claim as my invention—

1. As an article of manufacture, a threaded nut having a laterally-projecting spring-stem inclined toward and extending beyond the plane of the inner face of the body portion, and a toe-piece projecting laterally in the opposite direction from the spring-stem.

2. As an article of manufacture, a threaded nut having a laterally-projecting spring-stem inclined toward and extending beyond the plane of the inner face of the body portion, and a spring toe-piece projecting laterally from the opposite side of the nut-body and being inclined toward the plane of its inner face, and being of less tension than the spring-stem.

3. As an article of manufacture, a threaded nut having a laterally-projecting spring-stem inclined toward and extending beyond the plane of the inner face of the body portion, and a spring toe-piece projecting laterally from the opposite side of the nut-body and being inclined toward and extending beyond the plane of its inner face, and being of less tension than the spring-stem.

4. As an article of manufacture, a pair of threaded nuts united by a bow-spring curved toward and extending beyond the plane of the inner faces of the nuts, each nut having a toe-piece projecting laterally and in the opposite direction from the spring.

5. As an article of manufacture, a pair of threaded nuts united by a bow-spring curved toward and extending beyond the plane of the inner faces of the nuts, each nut having a spring toe-piece projecting laterally and in the opposite direction from the uniting-spring, and being inclined toward the plane of the inner face of the nut.

6. As an article of manufacture, a pair of threaded nuts united by a bow-spring curved toward and extending beyond the plane of the inner faces of the nuts, each nut having a spring toe-piece projecting laterally and in the opposite direction from the uniting-spring, and being inclined toward and extending beyond the plane of the inner face of the nut.

JOSEPH J. HARRELL.

Witnesses:
LOUIS K. GILLSON,
HESTER B. BAIRD.